(12) United States Patent
Kim et al.

(10) Patent No.: US 9,093,685 B2
(45) Date of Patent: Jul. 28, 2015

(54) METHODS OF MAKING MEMBRANE ELECTRODE ASSEMBLIES

(75) Inventors: Yu Seung Kim, Los Alamos, NM (US);
Kwan-Soo Lee, Los Alamos, NM (US);
Tommy Q. T. Rockward, Rio Rancho, NM (US)

(73) Assignee: LOS ALAMOS NATIONAL SECURITY, LLC, Los Alamos, NM (US)

(*) Notice: Subject to any disclaimer, the term of this patent is extended or adjusted under 35 U.S.C. 154(b) by 1390 days.

(21) Appl. No.: 12/321,466

(22) Filed: Jan. 20, 2009

(65) Prior Publication Data

US 2010/0183804 A1 Jul. 22, 2010

(51) Int. Cl.
*H01M 4/88* (2006.01)
*H01M 8/10* (2006.01)
*H01M 8/02* (2006.01)

(52) U.S. Cl.
CPC .......... *H01M 8/1004* (2013.01); *H01M 4/8814* (2013.01); *H01M 4/8828* (2013.01); *H01M 4/8842* (2013.01); *H01M 4/8882* (2013.01); *H01M 4/8896* (2013.01); *H01M 8/1023* (2013.01); *H01M 8/1039* (2013.01); *Y02E 60/522* (2013.01)

(58) Field of Classification Search
USPC ........... 427/115; 156/230, 235; 429/483, 535, 429/493
See application file for complete search history.

(56) References Cited

U.S. PATENT DOCUMENTS

| | | | |
|---|---|---|---|
| 5,211,984 A | | 5/1993 | Wilson |
| 5,330,860 A | * | 7/1994 | Grot et al. ............ 429/494 |
| 5,346,780 A | | 9/1994 | Suzuki |
| 5,716,437 A | * | 2/1998 | Denton et al. ............ 106/31.92 |
| 5,945,231 A | * | 8/1999 | Narayanan et al. ............ 429/487 |
| 5,998,057 A | | 12/1999 | Koschany et al. |
| 6,391,486 B1 | | 5/2002 | Narayanan et al. |
| 7,416,809 B2 | * | 8/2008 | Narayanan et al. ............ 429/483 |

(Continued)

FOREIGN PATENT DOCUMENTS

WO   WO 2006067872 A1 * 6/2006

OTHER PUBLICATIONS

Chen et al., "Fuel cell performance of polyetheretherketone-based polymer electrolyte membranes prepared by a two-step grafting method," J. Membrane Science, v. 319, issue 1, pp. 1-4 (Jul. 2008).

(Continued)

*Primary Examiner* — Atul P. Khare
(74) *Attorney, Agent, or Firm* — Samuel L. Borkowsky (57) ABSTRACT

Method of making a membrane electrode assembly comprising: providing a membrane comprising a perfluorinated sulfonic acid; providing a first transfer substrate; applying to a surface of the first transfer substrate a first ink, said first ink comprising an ionomer and a catalyst; applying to the first ink a suitable non-aqueous swelling agent; forming an assembly comprising: the membrane; and the first transfer substrate, wherein the surface of the first transfer substrate comprising the first ink and the non-aqueous swelling agent is disposed upon one surface of the membrane; and heating the assembly at a temperature of 150° C. or less and at a pressure of from about 250 kPa to about 3000 kPa or less for a time suitable to allow substantially complete transfer of the first ink and the second ink to the membrane; and cooling the assembly to room temperature and removing the first transfer substrate and the second transfer substrate.

32 Claims, 5 Drawing Sheets

(56) References Cited

U.S. PATENT DOCUMENTS

| | | | |
|---|---|---|---|
| RE41,651 E * | 9/2010 | Kosako et al. | 429/480 |
| 2002/0136940 A1 * | 9/2002 | Mao et al. | 429/30 |
| 2005/0072514 A1 * | 4/2005 | Yan et al. | 156/230 |
| 2006/0234101 A1 | 10/2006 | Kaneko | |
| 2006/0240301 A1 | 10/2006 | Kim et al. | |
| 2006/0280981 A1 * | 12/2006 | Mehmi | 429/30 |
| 2007/0099052 A1 | 5/2007 | Frey et al. | |
| 2007/0227650 A1 * | 10/2007 | Yan et al. | 156/230 |
| 2007/0238001 A1 * | 10/2007 | Koyama | 429/33 |
| 2007/0264551 A1 | 11/2007 | Matsunaga | |
| 2007/0269699 A1 * | 11/2007 | Pak et al. | 429/30 |
| 2008/0020253 A1 * | 1/2008 | Neubert et al. | 429/30 |
| 2008/0096078 A1 * | 4/2008 | Miyake | 429/33 |

OTHER PUBLICATIONS

Gubler et al., "Performance and Durability of Membrane Electrode Assemblies Based on Radiation-Grafted FEP-$g$-Polystyrene Membranes," Fuel Cells, v. 4, issue 3, pp. 196-207 (Aug. 2004).

Jorissen et al., "New membranes for direct methanol fuel cells," J. Power Sources, v.105, issue 2, pp. 267-273 (Mar. 2002).

Uchida et al., "New Preparation Method for Polymer-Electrolyte Fuel Cells," J. Electrochem. Soc., v. 142, (2) pp. 463-468 (Feb. 1995).

* cited by examiner

METHODS OF MAKING MEMBRANE ELECTRODE ASSEMBLIES

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD OF THE INVENTION

The present invention relates to novel compositions comprising swelling agents, and methods of using swelling agents to produce membrane electrode assemblies, for applications that include but are not limited to sensors and/or electrochemical devices, at lower temperature and pressure conditions.

BACKGROUND OF THE INVENTION

Current methods for membrane electrode assembly (MEA) fabrication are decal transfer (described, e.g., in U.S. Pat. No. 5,211,984, issued to Wilson et al.) and gas diffusion electrode transfer methods (described, e.g., in U.S. Pat. No. 5,998,057, issued to Koschany et al.). Both methods involve a hot pressing procedure at a relatively high temperature (125-300° C.). The high temperature process has been deemed necessary to form a durable interface between the membrane and electrode, one reason for which is that the temperature must be higher than 120° C., which is the softening temperature of the current standard industrial fuel cell membrane material comprising perfluorinated sulfonic acids (PFSAs) (e.g. Nafion™).

Another desirable membrane for MEAs is hydrocarbon-based polymers. For this type of membrane, PFSA ionomer is the preferred material to bind the membrane to the electrode, which helps offset the low permeability of the hydrocarbon membrane. However, a significant concern for using hydrocarbon based membrane-PFSA bonded electrode assemblies is that the two materials are not fully chemically compatible. In addition, most thermally stable hydrocarbon based membranes have a softening temperature higher than 250° C. The chemical incompatibility between hydrocarbon membrane and PFSA ionomer and higher softening temperature make it difficult to form a durable interface between the two components, which often results in delamination under operating conditions and subsequent performance degradation. This issue is described in a number of publications, including Chen et al., "Fuel cell performance of polyetheretherketone-based polymer electrolyte membranes prepared by a two-step grafting method," J. Membrane Science, v. 319, issue 1, pp. 1-4 (2008); Gubler et al., "Performance and Durability of Membrane Electrode Assemblies Based on Radiation-Grafted FEP-g-Polystyrene Membranes," Fuel Cells, v. 4, issue 3, pp. 196-207 (2004), and Jörissen et al., "New membranes for direct methanol fuel cells," J. Power Sources, v. 105, issue 2, pp. 267-273 (2002). Therefore, few reports have published fuel cell performance of MEAs using hydrocarbon membranes, and the performance results that have been published show neither superior performance to MEAs having a Nafion™ membrane, nor an increase in stability.

Yet another concern associated with high temperature processing is degradation of polymer electrolytes and/or changing electrode structure in both MEAs using PFSA and hydrocarbon membranes. To prevent polymer degradation during hot temperature pressing, the proton form of the membrane and ionomer may be converted to the more thermally stable salt form (e.g. sodium or tetra butyl ammonium (TBA)) before hot pressing. The conversion process adds to the complexity of MEA fabrication in terms of, for example, material cost, processing time and/or energy consumption. The electrode structure can be also adversely influenced by high temperature processing, resulting in lower fuel cell performance and longer catalyst activation time for thermally aged MEAs.

There exists a need, therefore, for methods of making stable MEAs at lower temperatures which have high-efficiency, high-durability, and good compatibility between the membrane and the material used to bind the electrodes to the membrane, which results in good mechanical stability. There exists a further need for a method of making good quality MEAs which utilizes a hydrocarbon-based membrane.

SUMMARY OF THE INVENTION

The present invention meets the aforementioned need by utilizing a swelling agent, which is applied to the electrode or to a gas diffusion layer prior to forming a membrane electrode assembly by a hot pressing procedure, in which pressure is applied at a temperature of 150° C. or lower. Without wishing to be limited by theory, it is believed that applying the swelling agent onto the electrode or to the gas diffusion layer increases the chain mobility of the ionomer in the electrode-membrane interface by reducing the softening point of the ionomer (sometimes referred to as the "plasticization effect"). The increased chain mobility allows partial mixing of polymers in the membrane and electrode, thus increasing chemical compatibility between materials (e.g., PFSA) used to bind the electrode to either a PFSA or a hydrocarbon-based membrane. This results in good adhesion of the electrode to the membrane, and therefore good mechanical stability under normal operating conditions, increased efficiency and performance, and increased durability. The process also may be carried out at a lower pressure than other processes, which together with the lower temperature, results in more energy-efficient production.

Whereas the "plasticization effect" has long been understood, the application thereof to membrane electrode assemblies to date has been limited to aqueous plasticizers. The use of aqueous solutions (for example, alcohol/water solutions, as taught in U.S. Pat. No. 6,391,486, issued to Narayanan et al.) as swelling agents does not result in stable MEAs, and in fact often results in excessive membrane swelling and/or membrane dissolution. In addition, the pressing process must be carried out at temperatures of at least 140° C. and at a pressure of about 3500 kPa to about 10,000 kPa. In contrast, Applicants have found that the use of suitable non-aqueous swelling agents may require lower temperatures and pressures of 3000 kPa or less for assembly, and that the resulting MEAs are mechanically stable.

The following describe some non-limiting embodiments of the present invention.

According to one embodiment of the present invention, a method of making a membrane electrode assembly is provided comprising providing a membrane comprising a perfluorinated sulfonic acid; providing a first transfer substrate; applying to a surface of the first transfer substrate a first ink, said first ink comprising an ionomer and a catalyst; applying to the first ink a suitable non-aqueous swelling agent; forming an assembly comprising:

i. the membrane; and
ii. the first transfer substrate, wherein the surface of the first transfer substrate comprising the first ink and the non-aqueous swelling agent is disposed upon one surface of the membrane; and heating the assembly at a temperature of 150° C. or less and at a pressure of from about 250 kPa to about 3000 kPa for a time suitable to allow substantially complete transfer of the first ink to the membrane; and cooling the assembly to room temperature and removing the first transfer substrate.

According to another embodiment, a method of making a membrane electrode assembly is provided, comprising providing a hydrocarbon-based membrane; providing a first transfer substrate; applying to a surface of the first transfer substrate a first ink, said first ink comprising an ionomer and a catalyst; applying to the first ink a suitable non-aqueous swelling agent; forming an assembly comprising:
i. the membrane; and
ii. the first transfer substrate, wherein the surface of the first transfer substrate comprising the first ink and the non-aqueous swelling agent is disposed upon one surface of the membrane; and heating the assembly at a temperature of 150° C. or less and at a pressure of from about 250 kPa to about 3000 kPa for a time suitable to allow substantially complete transfer of the first ink to the membrane; and cooling the assembly to room temperature and removing the first transfer substrate.

According to yet another embodiment of the present invention, a method of making a membrane electrode assembly is provided, comprising providing a hydrocarbon-based membrane; providing a first transfer substrate; applying to a surface of the first transfer substrate a first ink, said first ink comprising an perfluorosulfonate ionomer ionomer and a catalyst; applying to the first ink a suitable non-aqueous swelling agent, wherein the swelling agent is an alcohol; providing a second transfer substrate; applying to a surface of the second transfer substrate a second ink, said second ink comprising an ionomer and a catalyst; applying to the second ink a non-aqueous swelling agent, wherein the swelling agent is an alcohol; forming an assembly comprising:
i. the membrane; and
ii. the first transfer substrate, wherein the surface of the first transfer substrate comprising the first ink and the non-aqueous swelling agent is disposed upon one surface of the membrane; and
iii. the second transfer substrate, wherein the surface of the second transfer substrate comprising the second ink and the non-aqueous swelling agent is disposed upon the opposing surface of the membrane;

heating the assembly at a temperature of 125° C. or less and at a pressure of from about 250 kPa to about 1000 kPa for a time suitable to allow substantially complete transfer of the first ink and the second ink to the membrane; and cooling the assembly to room temperature and removing the first transfer substrate and the second transfer substrate.

DETAILED DESCRIPTION OF THE INVENTION

The present invention relates to methods of making stable membrane electrode assemblies at temperatures below 150° C. and at pressures below 3000 kPa. In all embodiments of the present invention, all percentages are by weight of the total composition, unless specifically stated otherwise. All ratios are weight ratios, unless specifically stated otherwise. All ranges are inclusive and combinable. All numerical amounts are understood to be modified by the word "about" unless otherwise specifically indicated.

"Non-aqueous swelling agent," as used herein, means a swelling agent that is substantially free of water. By "substantially free," is meant that any water that is present is incidentally present (for example, due to environmental conditions) and comprises less than 1% of the swelling agent.

"Suitable swelling agent," as used herein, means a swelling agent that results in a stable MEA upon application of a pressure of 3000 kPa or less at a temperature of 150° C. or less, without undue swelling, burning, oxidation or other damage to the membrane.

"Stable," as used herein in reference to MEAs, means that no separation (non-adhesion) of the electrode(s) (anode and/or cathode) from the membrane is visible to the unaided eye after the membrane assembled by applying heat and pressure as described herein is first placed in a solution of 0.5M $H_2SO_4$ for about 1.5 hours, and boiling at a temperature of 100° C. for about 1.5 hours.

"Substantially complete transfer," as used herein in reference to transferring an ink to the membrane, means that after heat and pressure are applied to the assembly as described herein, upon removal of the transfer substrate at least 99% of the ink has been transferred to the membrane, and 1% or less remains on the transfer substrate.

The method comprises the step of providing a membrane for the membrane electrode assembly. The formation of membranes is also well known in the art. The preferred type comprises perfluorinated sulfonic acid (PFSA) polymer electrolyte in which the entire membrane structure has ion exchange characteristics. These membranes are commercially available, and a typical example of a commercially available PFSA polymer is sold by E.I. Dupont de Nemours & Co. under the tradename Nafion™. Thus, the membranes of the present invention may comprise PFSA. In one embodiment, the PFSA is a salt, wherein the salt may comprise a counterion selected from the group consisting of sodium, potassium, lithium, iron, cesium, magnesium, cesium, tetrabutyl ammonium, tetramethyl ammonium, tetrapropyl ammonium, tetraethyl ammonium, and combinations thereof. In an alternative embodiment, the membrane is a protonated PFSA membrane (i.e., "hydrogenated" or "acid form"), in which any counterions that are present are $H^+$. In yet another embodiment, the membrane comprises hydrocarbons (i.e., is "hydrocarbon-based"). The hydrocarbon-based membranes of the present invention may comprise poly (arylene) materials such poly(arylene ether sulfone), poly (arylene ether ketone), polyimide, poly(phenylene), poly (phosphine oxide), poly(nitrile), derivatives of any of the foregoing, and combinations thereof.

The method further comprises the step of providing a first and optionally a second transfer substrate. Transfer substrates also may be referred to as "decals, "blanks," or "release blanks." An ink, suitable for use as electrode(s) in the assembled MEA, is applied to the transfer substrate by painting, spraying or other suitable means, and heating until dry. Optionally, a releasing agent may be applied to the first transfer substrate and/or the second transfer substrate prior to applying the ink. One example of a suitable releasing agent is TFE spray (e.g., Camie 2000™ TFE-Coat, available from Adhesive Solutions Co., LLC (Columbia City, Ind.)). The ink may comprise an ionomer, a catalyst, and suitable solvents. Suitable transfer substrates, methods of use thereof, and inks are described in U.S. Pat. No. 5,211,984, issued to Wilson. In the present invention, the ionomer may be a perfluorosulfonate ionomer, the catalyst a noble metal-particulate carbon composite, and the solvents water and glycerol. Optionally, the ionomer may be converted to a salt form prior to heating, for example, by adding a molar equivalent of tetra butyl ammonium hydroxide (TBAOH) or other suitable base prior to the ink solution. Other suitable inks are described in WO94/25993 (E I DuPont de Nemours and Company), M. Uchida et al., "New Preparation Method for Polymer-Electroyte Fuel Cells", J. Electrochem. Soc. v. 142, (2) pp. 463-468 (1995), U.S. Pat. No. 5,346,780 (Suzuki,) and U.S. Pat. No. 5,716,437 (Denton et al.).

The present invention further comprises the step of applying to the catalyst ink (which may be an anode ink or a cathode ink) a suitable non-aqueous swelling agent ("swelling agents"). The swelling agents of the present invention may serve to swell polymer chains and decrease polymer softening temperatures, without dissolving the membrane or ionomer. This occurs without the swelling agent undergoing significant polymer chain entanglement with the ionomer or with other components of the MEA. A wide range of swelling agents can be utilized, such as alcohols, organic solvents, polymer dispersions, and the like. However, the selection of swelling agent is dependent upon the type of membrane and electrode binder, and several factors must be considered. First, adequate evaporation rate of the swelling agent is required. Using swelling agents with higher evaporation rate have the advantage of significantly lowering the pressing temperature necessary to ensure good adhesion. Swelling agents having low evaporation rates require a higher processing temperature to remove residual solvent. However, too fast of an evaporation rate makes it difficult to control MEA processing. Second, the swelling agent needs to have an appropriate swelling power. Excessively swollen membrane can cause an uneven membrane surface after hot pressing temperature. Third, the swelling agent should not dissolve the membrane and electrode binder at the hot pressing temperature. For example, propylene glycol dissolves PFSAs at relatively low temperature. This suggests that if propylene glycol is used as a swelling agent for PFSAs at relatively high temperature, the membrane thickness can be decreased and/or the edge part of MEA may exhibit deterioration. Fourth, the oxidation of the swelling agent in the presence of highly reactive catalyst may cause burning of the catalyst layer and membrane. Finally, the swelling agent should have good wetting properties in order to uniformly disperse the swelling agent onto the decal electrode. For example, water is not a good swelling agent due to its poor wetting property.

Swelling agents suitable for use in the present invention include, but are not limited to, methanol, ethanol, iso-propanol, n-propanol, propylene glycol, 1,4-butanediol, ethylene glycol, 1,5-pentanediol, 1,2,4-butanetriol, glycerol, acetone, toluene, dimethylacetamide, N-methyl pyrrolidone, chloroform, perfluorinated sulfonic acid dispersion, and combinations thereof. In one embodiment, the swelling agent is an alcohol. In an alternative embodiment, the swelling agent is a polar aprotic solvent, and may be selected from the group consisting of acetone, dimethylacetamide, N-methylpyrrolidone, dimethyl sulfoxide, and combinations thereof.

In one embodiment, when the membrane comprises a non-salt perfluorinated sulfonic acid, the swelling agent may comprise acetone, ethanol, n-propanol, dimethylacetamide, perfluorinated sulfonic acid, or combinations thereof, and preferably comprises n-propanol, dimethylacetamide perfluorinated sulfonic acid, or combinations thereof.

In yet another embodiment, when the membrane comprises a salt of the perfluorinated sulfonic acid, the swelling agent may comprise acetone, dimethylacetamide, ethanol, n-propanol, 1,4-butanediol, 1,5-pentanediol, 1,2,4-butanetriol, glycerol, or combinations thereof, and preferably comprises acetone, dimethylacetamide, ethanol, n-propanol, 1,5-pentanediol, or combinations thereof.

In yet another embodiment, when the membrane electrode assembly comprises a hydrocarbon-based membrane, the swelling agent may comprise 1,4-butanediol, 1,2,4-butanetriol, 1,5-pentanediol, glycerol, or combinations thereof.

Figure 1:
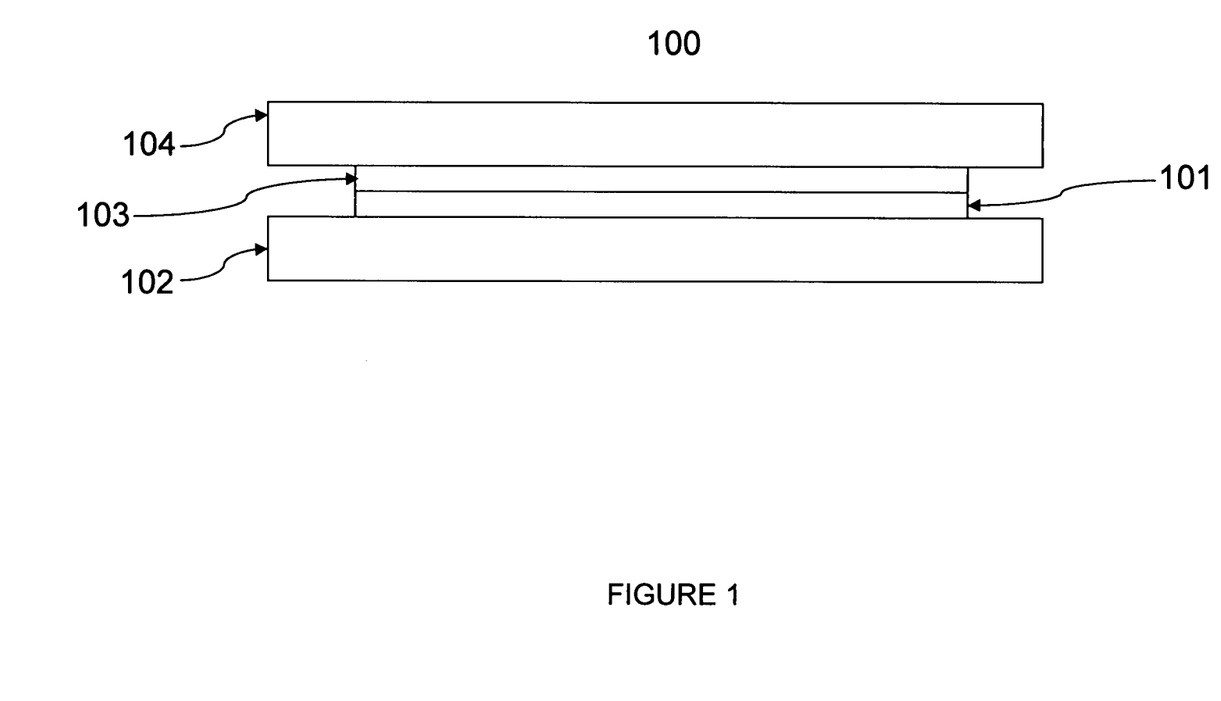
FIG. 1 depicts one embodiment of the method of the present invention comprising an anode, prior to removal of the first transfer substrate.
Figure 2:
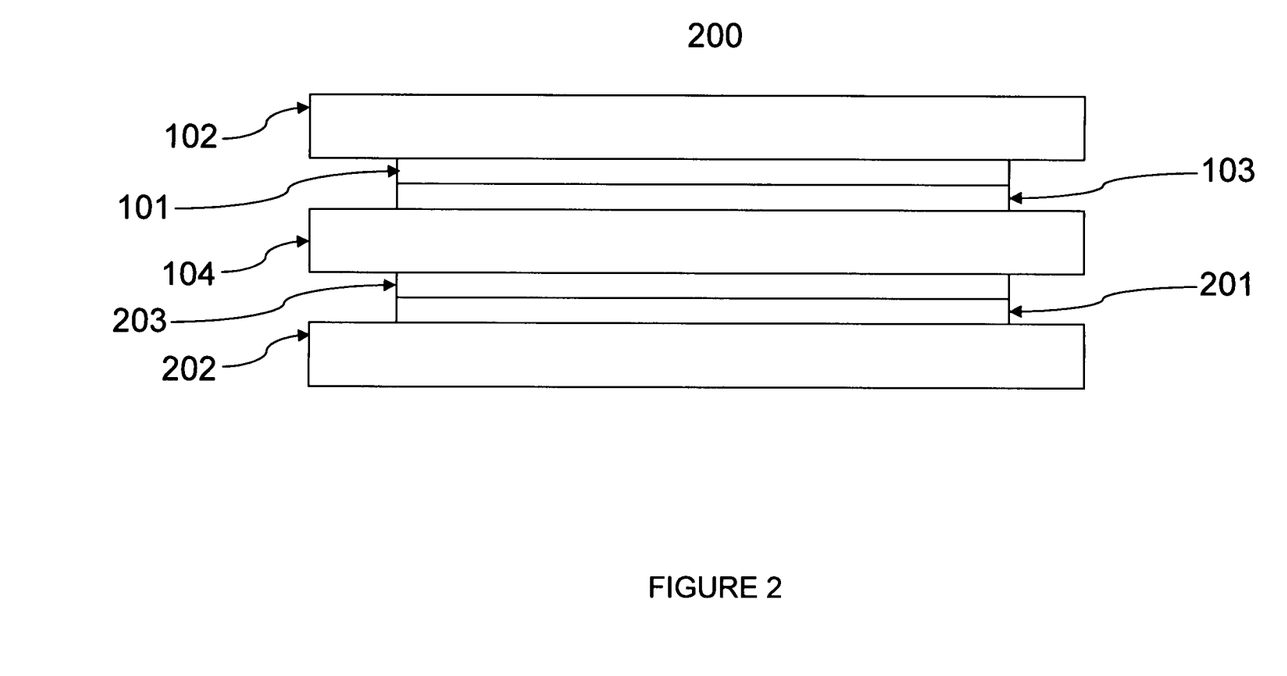
FIG. 2 depicts an alternative embodiment of the present invention comprising both an anode and a cathode, prior to removal of the first and the second transfer substrates.
Figure 3:
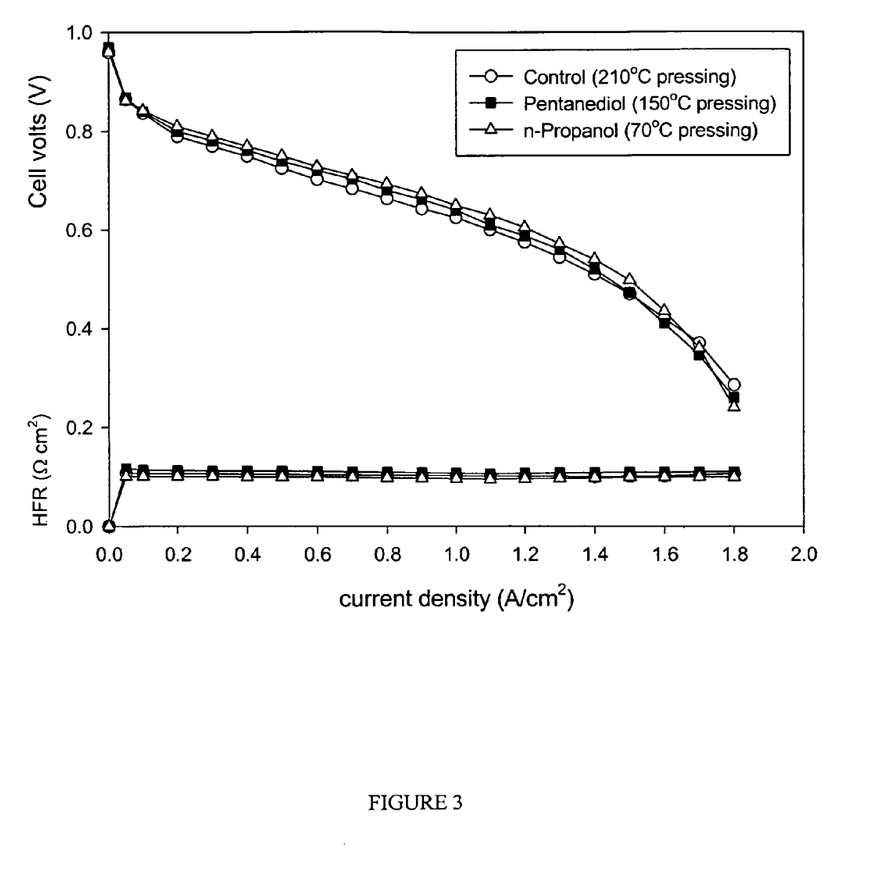
FIG. 3 shows the performance of the MEAs of the present invention, as indicated in a plot of cell volts and high frequency resistance (HFR) vs. current density, prepared with a suitable swelling agent as compared to MEAs having no swelling agent (control), wherein the control was prepared at a higher temperature. Membrane: Nafion™ 212; anode/cathode loadings are 0.2 mg Pt/cm$^2$ of 20% wt % Pt/C catalyst; anode/cathode pressures=30/30 psi, $T_{cell}$=80° C., $T_{humidifiers}$=105/80° C.
Figure 4:
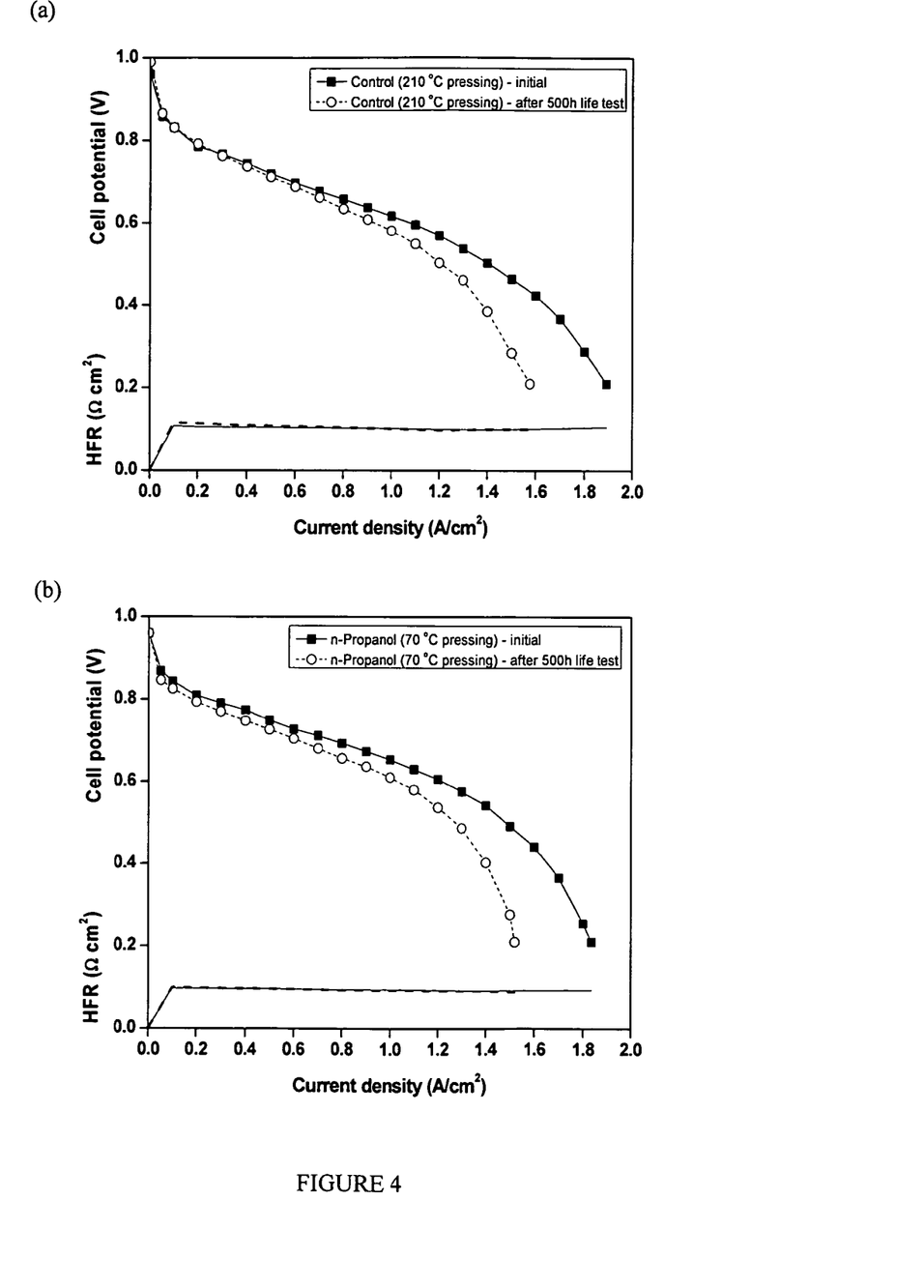
FIGS. 4(a) and 4(b) show the long-term stability of the MEAs of the present invention, before and after a 500 hour life test, as indicated in a plot of cell volts and high frequency resistance (HFR) vs. current density, prepared with a suitable swelling agent (b) as compared to MEAs having no swelling agent (a) (control), wherein the control was fabricated at a higher temperature. Membrane: Nafion™ 212, anode/cathode loadings are 0.2 mg Pt/cm$^2$ of 20 wt % Pt/C catalyst; anode/cathode pressures=30/30 psi, $T_{cell}$=80° C., $T_{humidifiers}$=105/80° C.: life test under constant voltage of 0.5 V; no swelling agent (210° C. pressing): decay rate=−0.50 mA/cm$^2$ h; with swelling agent (n-propanol, 70° C. pressing): decay rate=−0.54 mA/cm$^2$ h.
Figure 5:
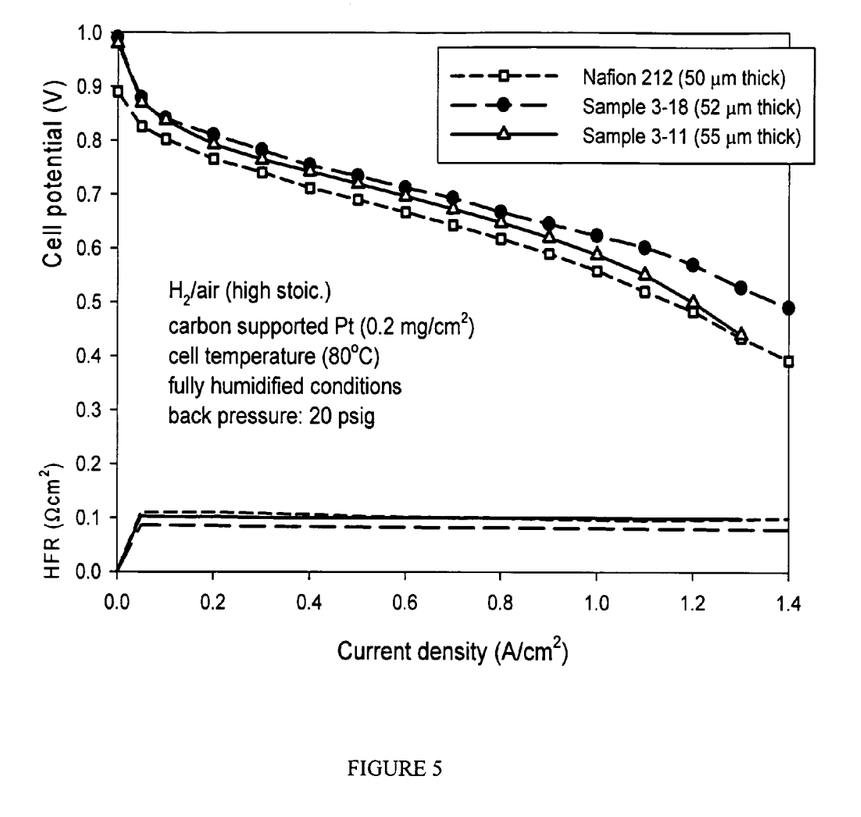
FIG. 5 shows the $H_2$/air fuel cell performance of MEAs fabricated using conventional method (Nafion 212, dotted line with squares) and the method of the present invention (samples 3-18 and 3-11 of Table 3), as indicated in a plot of cell volts and high frequency resistance (HFR) vs. current density. Membrane: Nafion 212. The anode/cathode loadings are 0.2 mg Pt/cm$^2$ of 20 wt % Pt/C catalyst. Anode/cathode pressures=20/20 psi, $T_{cell}$=80° C., $T_{humidifiers}$=105/80° C.

The present invention further comprises forming an assembly comprising the membrane, a first transfer substrate comprising either an anode or a cathode ink, and the swelling agent. FIG. 1 depicts one embodiment of an assembly 100 of the present invention, wherein a first (anode) ink 101 has been applied to a first transfer substrate 102, and a swelling agent 103 has been applied to the anode ink 101. The anode ink 101 comprising the swelling agent 103 is then placed in contact with a membrane 104. FIG. 2 depicts an alternative embodiment of the assembly of the present invention 200 in which a second (cathode) ink 201 has been applied to a second transfer substrate 202, and a swelling agent 203 (which may be the same or a different swelling agent than that which was applied to the anode ink) has been applied to the cathode ink 201. The cathode ink 201 comprising the swelling agent 203 is then placed in contact with the opposing side of the membrane 104.

The assembly is placed in a heated press, and heated at a temperature of 150° C. or less and at a pressure of about 3000 kPa or less, for a time suitable to allow substantially complete transfer of the first ink and the second ink to the membrane. The temperature and pressure necessary to ensure substantially complete transfer of the ink to the membrane will vary and is dependent upon the type of membrane and the type of swelling agent used. In one embodiment the temperature may be 150° C. or less, alternatively 125° C. or less, alternatively from about 30° C. to about 125° C., alternatively from about 30° C. to about 90° C., alternatively from about 60° C. to about 90° C., alternatively from about 60° C. to about 80° C., alternatively from about 30° C. to about 50° C. and alternatively from about 80° C. to about 120° C. The pressure may be from about 250 kPa to about 1000 kPa, and alternatively from about 1000 kPa to about 3000 kPa. After sufficient heating under pressure, the assembly is cooled to room temperature and the transfer substrate(s) are removed.

EXAMPLES

Example 1

Nafion Membrane/Nafion Bonded Electrode Assembly

Nafion™ 212 (DuPont) was used for the polymer membrane. Commercial Nafion™ dispersion (5% Nafion™, EW=1100, Ion Power) was used as the electrode binder. For the electro-catalyst, 20% Pt on Vulcan XC-72R carbon catalyst (Alfa AESAR) was used.

The following procedure may be used:

The commercial Nafion™ dispersion, is combined with the electro-catalyst in a weight ratio of 1:3 Nafion (dry)/Pt-C. An amount of TBAOH equal to a molar equivalent of the ionomer is added to convert the protonated ionomer to a $TBA^+$ form. Water and glycerol are added in weight ratios of about 1:5:20 carbon:water:glycerol. The mixture is agitated with ultrasound to uniformly disperse the supported catalyst in the ink and to form the mixture to a viscosity suitable for coating the release blank. A membrane of $Na^+Nafion$™ is provided by soaking (or boiling) a protonated membrane in a solution of 1% NaOH, followed by rinsing and drying. The ink is applied to a Teflon transfer substrate by painting, and the substrate is baked in an oven at 140° C. until dry. Additional layers may be added until the desired catalyst loading, as would be understood by one of skill in the art, is achieved.

Paint the selected swelling agent onto the ink with a brush. Form an assembly of a polymer electrolyte membrane and the transfer substrate coated with the swelling agent and the (anode or cathode) catalyst ink. If desired, the assembly may also include a second transfer substrate which has been coated with a swelling agent and catalyst ink.

Hot press the catalyst layer of the membrane assembly at a temperature above the deformation temperature of the converted ionomer at 1000 kPa for a sufficient time to form a glassy, smooth finish, e.g. about 6-10 minutes. Cool the assembly and then peel the release blank from the film, leaving the film decal adhered to the SPE membrane electrode surface. Lightly boil the dried assembly in 0.5 M $H_2SO_4$ for 90 minutes and rinse in deionized water at 100° C. for 90 minutes. Dry the assembly at 75° C. in a vacuum table for 10 min. to remove water and residual solvent.

MEAs fabricated using the above methods are described in Table 1. At temperatures below the pressing temperature, electrode transfer was incomplete.

TABLE 1

Electrode transfer to membranes comprising the sodium salt of perfluorinated sulfonic acids ($Na^+$ form) at the indicated pressing temperature.

| Sample No. | Applied swelling agent | Boiling point | Temperature (° C.) Pressing | Electrode transfer[1]/Result |
|---|---|---|---|---|
| 1-1 | Methanol | 64.7 | 25 | I; Pt oxidation |
| 1-2 | Ethanol | 78.4 | 30 | C; moderate membrane swelling |
| 1-3 | Iso-propanol | 82.3 | 50 | I; Pt oxidation |
| 1-4 | n-propanol | 97 | 40 | C |
| 1-5 | Propylene glycol | 187 | 70 | I; membrane dissolution |
| 1-6 | 1,4 butanediol | 230 | 70 | C; moderate membrane swelling |
| 1-7 | Ethylene glycol | 197.3 | 100 | I; membrane dissolution |
| 1-8 | 1,5 pentanediol | 242 | 100 | C |
| 1-9 | 1,2,4 butanetriol | ~290 | 120 | C; moderate membrane swelling |
| 1-10 | Glycerol | 290 | 120 | C; excessive membrane swelling |
| 1-11 | Acetone | 56 | 30 | C |
| 1-12 | Toluene | 110.6 | 30-80 | I; lack of adhesion |
| 1-13 | Dimethylacetamide | 165 | 30 | C |
| 1-14 | N-methyl pyrrolidone | 202 | 125 | C |
| 1-15 | Chloroform | 61 | 30-60 | I; lack of adhesion |

[1]"C" means that electrode transfer to the membrane is complete; "I" means that transfer was incomplete.

Example 2

Protonated Nafion™ Membrane/Nafion™ Bonded Electrode Assembly

This example shows the preparation of a membrane electrode assembly comprising a protonated PFSA membrane. The protonated form of Nafion bonded electrode is typically more difficult to transfer to the membrane due to greater adhesion with decal substrate. Commercial Nafion™ dispersion (5% Nafion™, EW=1100, Ion Power) was used as the electrode binder. For the electro-catalyst, 20% Pt on Vulcan XC-72R carbon catalyst (Alfa AESAR) was used.

The procedure is as follows:

The commercial Nafion™ dispersion, is combined with the electro-catalyst in a weight ratio of 1:3 Nafion™ (dry)/Pt-C. Water and glycerol are added in weight ratios of about 1:5:20 carbon:water:glycerol. The mixture is agitated with ultrasound to uniformly disperse the supported catalyst in the ink and to form the mixture to a viscosity suitable for coating the release blank. Clean a Teflon transfer substrate and coat the blank with a thin layer of mold release (e.g., a TFE spray). The ink is applied to a Teflon transfer substrate by painting, and the substrate is baked in an oven at 135° C. until dry. Additional layers may be added until the desired catalyst loading, as would be understood by one of skill in the art, is achieved.

Paint the selected swelling agent onto the ink with a brush. Form an assembly of a polymer electrolyte membrane and the transfer substrate coated with the swelling agent and the anode or cathode ink. If desired, the assembly may also include a second transfer substrate coated with a swelling agent and catalyst ink.

Hot press the catalyst layer of the membrane assembly at a temperature above the deformation temperature of the converted ionomer at 500-3000 kPa for a sufficient time to form a glassy, smooth finish, e.g. about 6 minutes. Cool the assembly and then peel the release blank from the film, leaving the film decal adhered to the SPE membrane electrode surface. Dry the assembly at 75° C. in a vacuum table for 10 min. to remove residual solvent.

MEAs fabricated using selected swelling agents with the above method are described in Table 2. At temperatures below the pressing temperature, electrode transfer was incomplete.

TABLE 2

Electrode transfer to the perfluorinated sulfonic acids (H+ form) using various swelling agents for MEA processing.

| Sample No. | Applied swelling agent | Pressing Temperature (° C.) | Electrode transfer[1] (transfer %)/Result |
|---|---|---|---|
| 2-1 | Acetone | 30 | C; moderate membrane swelling |
| 2-2 | Ethanol | 30 | I; (90%) |
| 2-3 | | 50 | I; membrane dissolution |
| 2-4 | n-propanol | 30 | C |
| 2-5 | | 70 | I; membrane dissolution |
| 2-6 | Dimethyl acetamide | 30/50 | I; (50/70%) |
| 2-7 | | 70 | C |
| 2-8 | 1,5 pentanediol | 70 | I; (80%) |
| 2-9 | | 90 | C |

[1]"C" means that electrode transfer to the membrane is complete; "I" means that transfer was incomplete.

Example 3

Hydrocarbon Based Membrane/Nafion™ Bonded Electrode Assembly

Four different types of hydrocarbon based sulfonated copolymers were used for fuel cell membranes. Commercial Nafion™ dispersion (EW=1100, Ion Power) was used for the electrode binder. 20% Pt on Vulcan XC-72R carbon catalyst (Alfa AESAR) was used for the catalyst.

The following procedure was used:

For a membrane comprising sulfonated poly(arylene ether)s, Na+ sulfonated poly(arylene ether)s were dissolved in dimethylacetamide or N-methypyrrolidone (5 wt %) at room temperature for 12 hours. A clear yellow-brown solution was obtained. The solution was poured onto clean glass plate and cast into a membrane having a thickness of about 40-60 microns.

For electrode preparation, combine perfluorosulfonate ionomers, such as Nafion™ in 5% solution (from Solution Technology, Inc.) and a supported catalyst (20 wt % platinum on carbon from Alfa AESER) in a weight ratio of 1:3 Nafion (dry)/Pt-C. An amount of TBAOH equal to a molar equivalent of the ionomer is added to convert the protonated ionomer to a TBA+ form. Water and glycerol are added in weight ratios of about 1:5:20 carbon:water:glycerol. The mixture is agitated with ultrasound to uniformly disperse the supported catalyst in the ink and to form the mixture to a viscosity suitable for coating the release blank. The ink is applied to a Teflon transfer substrate by painting, and the substrate is baked in an oven at 140° C. until dry. Additional layers may be added until the desired catalyst loading, as would be understood by one of skill in the art, is achieved. Paint the selected swelling agent onto the transfer substrate with a brush. Form an assembly of a polymer electrolyte membrane and the transfer substrate coated with the swelling agent and the catalyst ink. If desired, the assembly may also include a second transfer substrate which has been coated with a swelling agent and catalyst ink.

Hot press the catalyst layer of the membrane assembly at a temperature above the deformation temperature of the converted ionomer (and at a temperature of 150° C. or lower) at 3000 kPa for a sufficient time to form a glassy, smooth finish, e.g. about 6-10 minutes. Cool the assembly and then peel the release blank from the film, leaving the film decal adhered to the SPE membrane cathode surface. Lightly boil the dried assembly in 0.5 M $H_2SO_4$ for 90 minutes and rinse in deionized water at 100° C. for 90 minutes. Dry the assembly at 75° C. in a vacuum table for 10 min. to remove water and residual solvent.

MEAs fabricated using the above methods are described in Table 3. At temperatures below the pressing temperature, electrode transfer was incomplete.

TABLE 3

Electrode transfer to the hydrocarbon based membrane (Na+ form)

| Sample No. | Polymer electrolytes | IEC[1] (mequiv/g) | Water uptake (wt %) | Swelling agent applications | Hot pressing Temp (° C.) | Electrode transfer[2] |
|---|---|---|---|---|---|---|
| 3-1 | Sulfonated polysulfone | 1.50 | 40 | No | 280 | C |
| 3-2 | | | | No | 210 | I |
| 3-3 | | | | 1,4 butane diol | 120-150 | C |
| 3-4 | | | | 1,2,4 butanetriol | 120-150 | C |
| 3-5 | | | | 1,5 pentanediol | 120-150 | C |
| 3-6 | | 1.72 | 56 | No | 280 | I |
| 3-7 | | | | No | 210 | I |

TABLE 3-continued

Electrode transfer to the hydrocarbon based membrane (Na+ form)

| Sample No. | Polymer electrolytes | IEC[1] (mequiv/g) | Water uptake (wt %) | Swelling agent applications | Hot pressing Temp (° C.) | Electrode transfer[2] |
|---|---|---|---|---|---|---|
| 3-8 | | | | 1,4 butane diol | 120-150 | C |
| 3-9 | | | | 1,2,4 butanetriol | 120-150 | C |
| 3-10 | | | | 1,5 pentanediol | 120-150 | C |
| 3-11 | | | | glycerol | 120-150 | C |
| 3-12 | Sulfonated poly(arylene ether)s | 1.45 | 20 | No | 250 | I |
| 3-13 | | | | No | 210 | I |
| 3-14 | | | | 1,5 pentanediol | 120-150 | C |
| 3-15 | | 1.86 | 43 | No | 250 | I |
| 3-16 | | | | glycerol | 150 | C |
| 3-17 | | 1.96 | 95 | No | 250 | I |
| 3-18 | | | | glycerol | 150 | C |
| 3-19 | Sulfonated poly(arylene ether)s | 1.75 | 27 | No | 280 | I |
| 3-20 | | | | glycerol | 120-150 | C |
| 3-21 | Multi-block sulfonated poly (arylene ether sulfone)s | 1.71 | 70 | No | 280 | I |
| 3-22 | | | | glycerol | 120-150 | C |

[1]IEC: Ion Exchange Capacity; milli-ion equivalent per 100 g of ionomer.
[2]"C" means that electrode transfer to the membrane is complete; "I" means that transfer was incomplete.

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Whereas particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of making a membrane electrode assembly, the method comprising steps of:
   applying a first ink to a surface of a first transfer substrate, the first ink comprising a protonated ionomer and a catalyst;
   drying the applied first ink by baking;
   applying to the dried first ink a suitable non-aqueous swelling agent selected from the group consisting of n-propanol, 1,5-pentanediol, and dimethyl acetamide;
   forming an assembly of the first transfer substrate and a membrane by contacting a first surface of the membrane with the first ink via the applied swelling agent, the membrane comprising a protonated perfluorinated sulfonic acid;
   hot-pressing the assembly at a temperature in a range from about 30° C. to about 90° C. and at a pressure of from about 250 kPa to about 3000 kPa for a length of time resulting in substantially complete transfer the first ink to the membrane;
   cooling the hot-pressed assembly to room temperature; and
   removing the first transfer substrate.

2. The method of claim 1, further comprising:
   applying a second ink to a surface of a second transfer substrate, the second ink comprising a protonated ionomer and a catalyst;
   drying the applied second ink by baking;
   applying to the dried second ink a suitable non-aqueous swelling agent selected from the group consisting of n-propanol, 1,5-pentanediol, and dimethyl acetamide;
   prior to said hot-pressing, forming the assembly to also comprise the second transfer substrate by contacting an opposing second surface of the membrane with the second ink via the applied non-aqueous swelling agent; and
   after said hot-pressing, also removing the second transfer substrate after cooling the assembly to room temperature.

3. The method of claim 2, further comprising applying a releasing agent to the first transfer substrate, the second transfer substrate, or both.

4. The method of claim 2, wherein the non-aqueous swelling agent applied to each of the dried first and second inks is n-propanol and the hot-pressing temperature is 30° C.

5. The method of claim 2, wherein the non-aqueous swelling agent applied to each of the dried first and second inks is dimethyl acetamide and the hot-pressing temperature is 70° C.

6. The method of claim 2, wherein the non-aqueous swelling agent applied to each of the dried first and second inks is 1,5-pentanediol and the hot-pressing temperature is 90° C.

7. The method of claim 2, wherein one of the first and second inks is a cathode ink and the other of the first and second inks is an anode ink.

8. The method of claim 1, wherein the non-aqueous swelling agent is n-propanol and the hot-pressing temperature is about 30° C.

9. The method of claim 1, wherein the non-aqueous swelling agent is 1,5-pentanediol and the hot-pressing temperature is about 90° C.

10. The method of claim 1, wherein the non-aqueous swelling agent is dimethyl acetamide and the hot-pressing temperature is 70° C.

11. The method of claim 1, wherein the hot-pressing time is about 6 minutes.

12. The method of claim 1, wherein the hot-pressing pressure is about 500 kPa to about 3000 kPa.

13. A method of making a membrane electrode assembly, the method comprising steps of:
applying a first ink to a surface of a first transfer substrate, the first ink comprising an ionomer salt and a catalyst;
drying the applied first ink by baking;
applying to the dried first ink a suitable non-aqueous swelling agent selected from the group consisting of n-propanol, 1,5-pentanediol, acetone, dimethyl acetamide, and N-methyl pyrrolidone;
forming an assembly of the first transfer substrate and a membrane by contacting a first surface of the membrane with the first ink via the applied non-aqueous swelling agent, the membrane comprising a salt of perfluorinated sulfonic acid;
hot-pressing the assembly at a temperature in a range from about 30° C. to about 125° C. and at a pressure of from about 250 kPa to about 3000 kPa for a length of time resulting in substantially complete transfer the first ink to the membrane;
cooling the hot-pressed assembly to room temperature; and
removing the first transfer substrate.

14. The method of claim 13, further comprising:
applying a second ink to a surface of a second transfer substrate, the second ink comprising an ionomer salt and a catalyst;
drying the applied second ink by baking;
applying to the dried second ink a suitable non-aqueous swelling agent selected from the group consisting of n-propanol, 1,5-pentanediol, acetone, dimethyl acetamide, and N-methyl pyrrolidone;
prior to said hot-pressing, forming the assembly to also comprise the second transfer substrate by contacting an opposing second surface of the membrane with the second ink via the applied swelling agent; and
after said hot-pressing, also removing the second transfer substrate after cooling the assembly to room temperature.

15. The method of claim 14, wherein the non-aqueous swelling agent applied to each of the dried first and second inks is n-propanol and the temperature is 40° C.

16. The method of claim 14, wherein the non-aqueous swelling agent applied to each of the dried first and second inks is 1,5-pentanediol and the hot-pressing temperature is 100° C.

17. The method of claim 14, wherein the non-aqueous swelling agent applied to each of the dried first and second inks is acetone and the hot-pressing temperature is 30° C.

18. The method of claim 14, wherein the non-aqueous swelling agent applied to each of the dried first and second inks is dimethyl acetamide and the hot-pressing temperature is 30° C.

19. The method of claim 14, wherein the non-aqueous swelling agent applied to each of the dried first and second inks is N-methyl pyrrolidone and the hot-pressing temperature is 125° C.

20. The method of claim 14, wherein one of the first and second inks is a cathode ink and the other of the first and second inks is an anode ink.

21. The method of claim 14, further comprising applying a releasing agent to the first transfer substrate, the second transfer substrate, or both.

22. The method of claim 13, wherein the non-aqueous swelling agent is acetone and the hot-pressing temperature is from about 30° C. to about 50° C.

23. The method of claim 13, wherein the salt of the perfluorinated sulfonic is a sodium salt, a potassium salt, or combinations thereof.

24. The method of claim 13, wherein the non-aqueous swelling agent is n-propanol and the hot-pressing temperature is from about 30° C. to about 50° C.

25. The method of claim 13, wherein the non-aqueous swelling agent is n-propanol and the hot-pressing temperature is about 40° C.

26. The method of claim 13, wherein the non-aqueous swelling agent is 1,5-pentanediol and the hot-pressing temperature is from about 80° C. to about 120° C.

27. The method of claim 13, wherein the non-aqueous swelling agent is 1,5-pentanediol and the hot-pressing temperature is 100° C.

28. The method of claim 13, wherein the non-aqueous swelling agent is acetone and the hot-pressing temperature is 30° C.

29. The method of claim 13, wherein the non-aqueous swelling agent is dimethyl acetamide and the hot-pressing temperature is 30° C.

30. The method of claim 13, wherein the non-aqueous swelling agent is N-methyl pyrrolidone and the hot-pressing temperature is 125° C.

31. The method of claim 13, wherein the hot-pressing time is in a range from about 6-10 minutes.

32. The method of claim 13, wherein the hot-pressing pressure is about 1000 kPa.

* * * * *